United States Patent [19]

Gerhard

[11] Patent Number: 5,268,190

[45] Date of Patent: Dec. 7, 1993

[54] PROCESS FOR THE PREPARATION OF AN OIL-IN-WATER EMULSION

[75] Inventor: Hup Gerhard, Leeuwarden, Netherlands

[73] Assignee: Friesland (Frico-Domo) Cooperatieve B.V., Leeuwarden, Netherlands

[21] Appl. No.: 691,539

[22] Filed: Apr. 25, 1991

[30] Foreign Application Priority Data

Apr. 26, 1990 [NL] Netherlands .......................... 9001001
Jul. 25, 1990 [NL] Netherlands .......................... 9001692

[51] Int. Cl.$^5$ ................................................ A23C 9/15
[52] U.S. Cl. ..................................... 426/580; 426/601; 426/583
[58] Field of Search ............... 426/602, 583, 580, 582, 426/801

[56] References Cited

U.S. PATENT DOCUMENTS

| | | | |
|---|---|---|---|
| 3,798,339 | 3/1974 | Peng | 426/580 |
| 4,265,924 | 5/1991 | Buhler | 426/582 |
| 4,291,067 | 9/1981 | Buhler | 426/582 |
| 4,309,417 | 1/1982 | Staples | 426/583 |
| 4,333,958 | 6/1982 | Egnell | 426/582 |
| 4,369,196 | 1/1983 | Sukegawa | 426/580 |
| 4,389,426 | 6/1983 | Reissmann | 426/602 |
| 4,748,034 | 5/1988 | de Rham | 426/583 |
| 4,782,138 | 11/1988 | Rialland | 426/583 |
| 4,790,998 | 12/1988 | Swartz | 426/602 |
| 4,844,923 | 7/1989 | Herrmann | 426/583 |
| 4,879,131 | 11/1989 | de Rahm | 426/583 |
| 4,897,279 | 1/1990 | Lehmann | 426/583 |
| 4,968,521 | 11/1990 | Melnychyn | 426/583 |
| 4,990,355 | 2/1991 | Gupta | 426/602 |
| 4,997,668 | 3/1991 | Johnson | 426/580 |
| 5,064,674 | 11/1991 | Girsh | 426/580 |
| 5,185,166 | 2/1993 | Nakagawa | 426/330.2 |

FOREIGN PATENT DOCUMENTS

| | | | |
|---|---|---|---|
| 0318326 | 5/1989 | European Pat. Off. | |
| 0398408 | 11/1990 | European Pat. Off. | |
| 2325133 | 12/1973 | Fed. Rep. of Germany | |
| 2239948 | 3/1975 | France | |
| 687633 | 9/1979 | U.S.S.R. | 426/583 |
| 1470896 | 4/1977 | United Kingdom | |
| 2170984 | 8/1986 | United Kingdom | 426/583 |
| 2223927 | 4/1990 | United Kingdom | |

OTHER PUBLICATIONS

J. Food Science, 43(5), 1559–1562, 1565 (1978), E. Tornberg.
J. Food Science, 55(2), 510–515(1990) J. Rinn et al.
Derwent File Supplier WPIL, AN=82-60269E.
J. Food Science 45, 1237–1242(1980) K. Yamauchi et al. "Emulsifying properties of whey protein".
Food Science & Technology Abstracts, 86-04-t-0025, S. Zalewska et al. "Influence of physico-chemical—".
Patent Abstract of Japan 6(35) ([913] Mar. 3, 1982, (Naoaki Sakamoto).
Zuivelzicht 68(19) 1976, JN DeWit et al & "De emulgerende—".

*Primary Examiner*—Carolyn Paden
*Attorney, Agent, or Firm*—Michael N. Meller

[57] ABSTRACT

A process for the preparation of a fat emulsion, which comprises emulsifying an oil or a fat in an aqueous phase, wherein by using an aqueous phase containing 0.1 to 3 wt. % of predominantly undenatured whey protein, the calcium content of which, expressed in percentages of the whey protein present, being 0.2–3 wt. % and the total content of minerals based on the whey protein being not more than 15 wt. %.

17 Claims, No Drawings

PROCESS FOR THE PREPARATION OF AN OIL-IN-WATER EMULSION

BACKGROUND OF THE INVENTION

This invention relates to the preparation of an oil-in-water emulsion suitable for the preparation of dairy or dairy-like products.

As is well-known, milk is an oil-in-water emulsion, the discontinuous phase being formed by milk fat and the continuous (aqueous) phase containing numerous substances, particularly proteins and sugars. Milk is the raw material for the preparation of numerous dairy products in which physicochemical changes are effected by the action of enzymes and/or microorganisms.

The problem of using milk as a raw material is that in view of its relatively short storage life the place of treatment must be near the place of production. Especially in very large countries, having regard to logistic problems, it would therefore be desirable to enable a more decentralized treatment of milk or milk-like products, e.g. near large population centres.

It is therefore an object of the invention to prepare an oil-in-water emulsion using as many standardized raw materials as possible and obtaining an emulsion which, as for the dairy-like products to be prepared therefrom, shows the greatest possible similarity with natural milk and which emulsion, together with milk, wholly or partly skimmed milk or reconstituted milk, can be processed to dairy or dairy-like products.

The prior art shows that attempts to prepare emulsions of the type in question have been made earlier. These attempts, however, have not led to the desired result, inter alia owing to the occurrence of organoleptic and/or stability problems.

Thus, European patent application 0 304 119 describes a process for the preparation of a semihard to hard cheese product, which comprises preparing an oil-in-water emulsion from a partially unsaturated fat and an aqueous phase, followed by preparing cheese, chiefly in a manner as known for the conventional cheese preparation from milk. As is established again in that patent application, the problem arising in the preparation of cheese in the manner described is that the taste of the resulting cheese is absolutely insufficient. For this reason the above application proposes that after the resulting curd has been separated from the whey, 0.1–2.5 wt. % of a concentrate of flavourings is added to the curd. However, it is known to be difficult to obtain a well balanced cheese taste, so that the final product will soon call forth an unnatural taste sensation and particularly a bitter taste sensation. Moreover, the examples of that patent application show that the process described was only used for the preparation of Cheddar cheese. This is understandable because Cheddar cheese is a type of cheese for which the soured cheese curd is ground and mixed with common salt. At that moment the flavour can be added in a simple manner. This, however, is not the case in the preparation of other cheeses.

Dutch patent application 7212074 proposes a process for the preparation of a fat emulsion which, e.g., can be used for the preparation of a cheese- or butter-like product. This preparation starts from an aqueous phase which contains an emulsifier but is free from casein micelles. The emulsifier used is cheese whey, aqueous solutions of caseinates, egg protein or Tween 80. A drawback of using a thus prepared emulsion for the preparation of cheese-like products is that both the taste and the consistency are dissatisfactory. Thus, for instance, Run 17 (Table A) shows that when using soybean oil the consistency of the cheese prepared is insufficient. Furthermore, practice has shown that a cheese prepared using this process is not always free from a typical margarine or oil taste.

German "Offenlegungsschrift" 23 25 133 describes a process for the preparation of a water-in-oil emulsion in which the aqueous phase, the pH of which ranges from 4.2 to 5.5, contains a globular, non-denatured whey protein in a proportion of 0.5–4%. This publication is silent as to the importance of the content of calcium and minerals in the emulsion, which partly explains the necessary presence of an emulsifier.

"Journal of Food Science", Vol. 45 (1980), page 1237 ff., describes a study into the emulsifying properties of whey proteins, the aqueous phase of the emulsions to be studied being formed by dialyzed sour whey. The calcium content in dialyzed sour whey is lower than the minimum calcium content in the emulsions according to the invention. Furthermore, on page 1239 of this publication it is noted that when calcium ions are present in a proportion of 0.1% (9 mmol) unstable emulsions are obtained, as apparently opposed to the inventive concept underlying the present application.

Finally, "Zuivelzicht" 68 (1976) 19, pages 442–445, describes a study into the emulsifying properties of whey protein concentrates obtained by ultrafiltration of sweet cheese whey. Apart from the fact that this publication is silent as to the importance of the content of calcium and minerals, the homogenization pressures used in the preparation of the emulsions described are 20 and 2 MPa, respectively, so that owing to the unduly small sizes of the fat particles contained therein the resulting emulsions are less suitable for the preparation of dairy products.

SUMMARY OF THE INVENTION

This invention proposes the preparation of an oil-in-water emulsion by emulsifying a fat in an aqueous phase, which aqueous phase contains 0.1–3 wt. % and preferably between 0.7 and 2.0 wt. % of predominantly undenatured whey protein and the calcium content of which, expressed in percentages of the whey protein present, is 0.2–3 wt. % and preferably between 0.2 and 2 wt. %, the total content of minerals based on the whey protein being not more than 15 wt% and preferably not more than 6 wt. %.

It has been found that a thus prepared emulsion is particularly suitable for the preparation of—especially fermented—dairy products when these are mixed with milk, wholly or partly skimmed milk or reconstituted milk. The resulting dairy or dairy-like products are particularly distinguished by their excellent taste.

Moreover, by using the process according to the invention it is possible to render the production of dairy products independent of the supply of milk, because the raw materials required can be supplied and stored separately. When using the process according to the invention, this also applies to the preparation of cheese. In fact, by using butter oil for the preparation of the emulsion according to the invention, which butter oil has good keeping qualities per se, the dairy production has become independent of the regular supply of milk of sufficient quality and in sufficient amount.

DESCRIPTION OF THE PREFERRED EMBODIMENT

In the process according to the invention the aqueous phase of the emulsion can be prepared in manners known per se. When starting from, e.g., cheese whey, calcium and other salts are removed using well-known techniques, such as desalting, diafiltration or ultrafiltration. The treatment of the whey must then be conducted to such an extent that the content of calcium and the total content of minerals have fallen to the above indicated value. Also, a combination of the above techniques can be used to arrive at the desired content.

According to a variant of the process of the invention the aqueous phase can be prepared by starting from whey preparations obtained by drying whey products.

The whey protein content in the aqueous phase of the emulsion according to the invention normally ranges from 0.1 to 3.0 wt. %. The protein content depends on the height of the desired fat content in the emulsion, and with increasing fat content the protein content must also be higher. The fat content of the emulsion normally ranges from 10 to 50 wt. % and preferably from 15 to 40 wt. %.

For the preparation of dairy or dairy-like products the emulsion according to the invention is mixed with wholly or partly skimmed milk. In view of the above, it may be clear that this can be both the natural product and a so-called reconstituted milk or skim milk which, using the techniques known for that purpose, can be prepared from—optionally low-fat—milk powder and water.

In the preparation of dairy or dairy-like products, starting from the emulsion according to the invention, it is usually desirable to start from an emulsion having a relatively high fat content. When using an emulsion having a relatively low-fat content and mixed with wholly or partly skimmed milk, there is obtained a mixture having a relatively low casein content and a high water content, which may adversely affect the quality of the dairy or dairy-like products to be prepared. If desired, the casein content in the mixture of the emulsion and the milk phase can be increased by adding milk powder or caseinate.

In the emulsions according to the invention the discontinuous phase may consist of both an oil and a fat. They include both animal oils or fats, such as milk fat or butter oil, and vegetable fats and oils, which are known per se in the food industry. It is noted that use can be made of both pure, optionally refined fats and wholly or partly hardened fats or fats obtained by transesterification, so that dairy products having a high content of mono- or polyunsaturated fatty acids can be obtained. Examples of particularly suitable vegetable oils are soybean oil, maize seed oil, arachide oil, sunflower oil, olive oil and rape oil. If desired, polyunsaturated oils can be hardened to obtain the desired composition. Thus it may be desirable to harden oils to the extent that within the temperature range of from 10 to 25° C. They contain so much solid fat that the fat globules in the discontinuous phase are sufficiently firm. This has a favourable effect on the consistency of some products, such as cheese-like products, which are prepared using the emulsion according to the invention.

When the process according to the invention starts from milk (butter) fat, use is preferably made of a fat the cholesterol level of which has been strongly reduced. The cholesterol level may be reduced using a known per se method, e.g., as described in "Prepared Foods" (1989) Vol. 158, No. 7, page 99, or in European patent application 0 174 848. It is noted that although, e.g., the idea of preparing cheese from cholesterol-poor (anhydrous) milk fat is known per se, the process according to the invention renders it possible for the first time to prepare a cholesterol-poor cheese which, as to the structure and consistency and organoleptic properties, is fully equivalent to the natural product.

In the preparation of the emulsion according to the invention the fat or the oil can be emulsified in the aqueous phase using a known per se technique. According to one method the fat phase is mixed with the aqueous phase in a conduit, the temperature of the mixture preferably ranging from 40° to 55° C. Subsequently, the mixture is fed to a homogenizer. By homogenizing at a pressure of from 1 to 2 MPa there can be obtained an emulsion in which the sizes of the fat globules correspond to those of the fat globules in natural milk. Sometimes it may be desirable to emulsify the emulsion at higher pressures so as to obtain fat globules having a decreased creaming tendency.

In the dairy or dairy-like product finally obtained there is no taste of fat (which may be very unpleasant, particularly when using non-milk fat), but the taste sensation is pleasantly creamy.

Another advantage is that in fermented products, that is to say in products in which enzymatic and/or bacteriological conversions have taken place, the emulsion remains very stable. Apparently, the whey protein layer around the fat globules is not affected by these enzymes or bacteria, so that the fat is not accessible to lipase enzymes which naturally occur in milk or are formed by the fermenting bacteria.

Different types of dairy or dairy-like products can be prepared from the emulsion according to the invention. Examples thereof are natural cheese, cheese on the basis of wholly or partly vegetable fats, yogurt products, ice cream, coffee milk, dessert products and the like. As stated before, the milk fat may be replaced completely by another fat, but also a partial replacement is quite possible. Thus it has been found that a ratio of 10-50% milk fat to 50-90% non-milk fats leads to products of excellent quality. Accordingly, the invention also enables the preparation of products containing more than 50% polyunsaturated fat, e.g., linoleic acid.

In the preparation of dairy or dairy-like products the emulsion according to the invention is mixed with low-fat milk, partly skimmed milk, reconstituted milk or the like. The preparation of some products only requires a pasteurizing heat treatment, while others require sterilization. Which treatment must be used is obvious to a skilled worker because the criterion for this is not the nature of the emulsion but that of the final product to be obtained.

The emulsion according to the invention endures a pasteurizing heat treatment. In combination with other, optionally added, conventional constituents having a higher content of calcium or minerals, the emulsion can become unstable at temperatures higher than those used in layer pasteurization. In those cases it may be necessary to heat the emulsion and the other constituents separately and to mix them together only after cooling. It can be easily established by way of experiment whether heating of the complete mixture may take place or whether this has to be carried out with the individual constituents.

It is noted that a fat distribution in the emulsion corresponding approximately to that in milk is desired for most of the dairy or dairy-like products to be prepared. If, however, it is desirable for the stability of the final product to distribute the fat in the emulsion more finely, it can be homogenized at a higher pressure without any problems, prior to mixing with the milk or milk-like phase.

The invention will be further illustrated by the following examples.

EXAMPLE 1

25 kg of a commercially sold, desalted and partly desugared whey powder were dissolved in 600 kg water. The solution contained 1.8 wt. % whey protein and the calcium content based on the whey protein was 0.33 wt. %. The total content of minerals based on the whey protein was 1.56 wt. %.

The solution was heated to 55° C. and mixed with 300 kg sunflower oil at a temperature of 10° C. Subsequently, the mixture was fed to a two-stage homogenizer, each stage of which had a pressure of 1 MPa. The emulsion was fed directly to a plate pasteurizer and pasteurized for 15 sec. at 70° C. Then the emulsion was cooled to 6° C. and stored. The fat content of the emulsion was 32%.

EXAMPLE 2

3.3 kg of a whey protein concentrate obtained by ultrafiltration which contained 60% protein based on the solid matter were dissolved in 100 kg water.

Based on the whey protein the calcium content was 0.67% and the minerals content 4.27%.

In a manner as described in Example 1 an emulsion was prepared by adding 45 kg of a vegetable fat mixture heated to 40° C., having an NMR value at 15° C. of 42, and at 24° C. of 24. The fat content of the emulsion was 31%.

EXAMPLE 3

850 kg low-fat milk, 200 kg whole milk having a fat content of 4.40% and 92.5 kg of the emulsion prepared according to Example 1 were mixed in a tank.

The mixture was heated in a pasteurizer for 15 sec. to 72° C., then cooled to a temperature of 32° C. and placed in a cheese-making tank. Then the colour, a calcium chloride solution, starter and rennet were added. In the manner conventional for cheese-making the mixture was converted to cheese.

After a ripening time of 6 weeks the cheese, which was of the semihard type, had an excellent consistency and taste.

The content of linoleic acid in the fat of the cheese was 50%.

EXAMPLE 4

Using the following stable dried products cheese was prepared: "low-heat" low-fat milk powder, anhydrous milk fat and desalted and partly desugared whey powder.

1 kg of the whey powder was dissolved in 25 kg water at a temperature of 55° C. To the solution were added 12.5 kg anhydrous milk fat heated to 45° C., and the resulting mixture was homogenized in a two-stage homogenizer at 2 and 1 MPa, respectively. The mixture thus homogenized was pasteurized for 15 sec. at 68° C. and then cooled to 8° C.

36 kg of the "low-heat" low-fat milk powder were dissolved in 338 kg water at a temperature of 40° C. Immediately after the powder had been dissolved, the mixture was cooled to 8° C. and this mixture was allowed to stand for 12 hours so as to swell the casein micelles. Subsequently, the earlier prepared emulsion of the anhydrous milk fat was added and the resulting cheese milk was heated for 15 sec. to 70° C., followed by cooling to the coagulation temperature. Then, with stirring, finely divided carbonic acid gas was passed through the milk until its pH had fallen to a value of 6.48. Calcium chloride, starter culture and rennet were added and the milk was converted in an otherwise known manner to a cheese of the semihard type.

After ripening the resulting cheese had an excellent consistency and a good taste.

EXAMPLE 5

575 kg low-fat milk, 375 kg whole milk having a fat content of 4.4% and 51.6 kg of the emulsion prepared according to Example 2 were mixed in a tank.

The fat in the milk consisted to about 50% of vegetable fat from the emulsion. The milk was pasteurized as described in Example 3. After adding starter, calcium chloride, a mold culture of the genus Penicillium and rennet a soft cheese of the Camembert type was prepared from this milk in a manner conventional for the preparation of soft cheese.

After ripening the taste of this cheese was found to be excellent and hardly, if at all, distinguishable from Camembert prepared from natural cows' milk.

EXAMPLE 6

Anhydrous milk fat (butter oil) was heated in a tank to 80° C. and activated carbon was stirred through. The mixture of butter oil and carbon was passed over a filter press, the filtered oil being circulated until a colourless oil free from carbon particles was obtained. The cholesterol level of the resulting butter oil was found to be lower than 2 mg/kg fat. Immediately after filtering vitamin E was added so as to stabilize the treated oil. 100 kg of this treated butter oil was heated to 50° C. and emulsified in a solution of 1 kg HYPROTAL in 200 kg water. This aqueous phase contained 1.84% whey protein, the calcium content based on the whey protein being 0.35% and the total mineral content based on the whey protein being 1.6%.

The butter oil was heated to 50° C. and homogenized in a two-stage homogenizer in the aqueous phase (40° C.), the pressure both in the first and in the second stage being not more than 1 MPa. Then the emulsion was pasteurized at 70° C. for 15 sec., followed by cooling the emulsion to 6° C.

278 kg of this emulsion was added to 2800 kg cold thermized low-fat milk. This mixture was pasteurized in the manner conventional for cheese-making and processed to Gouda cheese. Only the amount of rennet was increased by 10% to obtain a good coagulation. After ripening the taste, structure and consistency of this cheese were comparable to those of traditionally made Gouda cheese.

EXAMPLE 7

Butter oil was heated in a tank with a grating-type stirrer to 40° C. and then cooled slowly to 24° C. with continuous stirring. After the temperature of 24° C. had been obtained, the butter oil was left in the tank for at least 6 hours with continuous stirring so as to complete the crystallization process. Then the mixture of crystals and oil was passed over a vacuum filter. The liquid soft fraction was further treated with activated carbon as given in Example 6. In the same manner as described in Example 1 the treated butter oil was emulsified and the emulsion was used for the preparation of Edam-type cheese. After ripening the taste and structure of this cheese were equal to those of traditional Edam cheese. Only the consistency was found to be slightly softer.

EXAMPLE 8

The emulsion of Example 1 was once more homogenized but now at a pressure of 20 and 2 MPa, respectively. The homogenized emulsion was added to skim milk pasteurized at 90° C. and cooled to 72° C. The mixture having a fat content of 3% was cooled to 32° C. in a tank and inoculated with 0.001% of a deep-frozen concentrate of a yogurt culture and cultured for 15 hours. The resulting yogurt was stirred, filled into bottles and cooled to 7° C. Both the taste and the consistency of the resulting product were excellent.

EXAMPLE 9

100 kg low-fat milk and 18.9 kg whole milk having a fat content of 4.4% were mixed. A vanilla custard was made from this milk in the manner conventional for the preparation of vanilla custard using the normal ingredients. After the custard had been cooled to 72° C., 11 kg emulsion was added according to claim 1 and mixed with the custard. Then the custard was passed via a cooler to the filling machine and filled. The custard produced had a fat content of 3%, of which 20% milk fat and 80% sunflower oil. The custard had a good taste and consistency.

What I claim is:

1. A process for the preparation of a dairy product comprises emulsifying an oil or a fat in an aqueous phase, containing 0.1 to 3 wt. % of predominantly undenatured whey protein, the calcium content of which, expressed in percentages of the whey protein present, is 0.2-2 wt% and the total content of minerals based on the whey protein is not more than 15 wt%, and wherein the thus-obtained emulsion comprises 10-50 wt% oil or fat, and mixing the resulting emulsion with milk, wholly or partly skimmed milk or reconstituted milk, and then converting the resulting mixture, by conventional means, to a dairy or dairy-like product.

2. A process according to claim 1, wherein the aqueous phase contains between 0.7 and 2.0 wt. % of predominantly undenatured whey protein.

3. A process according to claim 2, wherein the total content of minerals in the aqueous phase based on the whey protein is not more than 6 wt. %.

4. A process according to claim 2, which comprises using a milk fat having a strongly reduced cholesterol level.

5. A process for the preparation of a dairy product, which comprises mixing a fat emulsion obtained using the process according to claim 2 with milk, wholly or partly skimmed milk or reconstituted milk, followed by converting the resulting mixture in an otherwise conventional manner to a dairy or dairy-like product.

6. A process according to claim 1 wherein the total content of minerals in the aqueous phase based on the whey protein is not more than 6 wt. %.

7. A process according to claim 6, which comprises using a milk fat having a strongly reduced cholesterol level.

8. A process according to claim 7, which comprises utilizing a soft fraction of fractionated milk fat.

9. A process for the preparation of a dairy product, which comprises mixing a fat emulsion obtained using the process according to claim 7 with milk, wholly or partly skimmed milk or reconstituted milk, followed by converting the resulting mixture in an otherwise conventional manner to a dairy or dairy-like product.

10. A process for the preparation of a dairy product, which comprises mixing a fat emulsion obtained using the process according to claim 6 with milk, wholly or partly skimmed milk or reconstituted milk, followed by converting the resulting mixture in an otherwise conventional manner to a dairy or dairy-like product.

11. A process according to claim 1, wherein the milk fat has a strongly reduced cholesterol level.

12. A process according to claim 11, wherein the fat is a soft fraction of fractionated milk fat.

13. A process according to claim 11, wherein the temperature of a soft fraction of milk fat obtained by fractionating milk fat at the start of the process ranges from 20° to 28° C.

14. A process for the preparation of a dairy product, which comprises mixing a fat emulsion obtained using the process according to claim 13 with milk, wholly or partly skimmed milk or reconstituted milk, followed by converting the resulting mixture in an otherwise conventional manner to a dairy or dairy-like product.

15. A process according to claim 1, wherein the dairy or dairy-like product is cheese.

16. A process according to claim 1, wherein the dairy or dairy-like product is yogurt.

17. A process according to claim 1, wherein the dairy or dairy-like product is custard.

* * * * *

UNITED STATES PATENT AND TRADEMARK OFFICE
CERTIFICATE OF CORRECTION

PATENT NO. : 5,268,190
DATED      : December 7, 1993
INVENTOR(S): HUP, Gerhard

It is certified that error appears in the above-identified patent and that said Letters Patent is hereby corrected as shown below:

Title page: item [19] change "Gerhard" to
                             read --Hup--

Title page: item [75] change
                inventor's name to read
                    --Gerhard Hup--

Signed and Sealed this

Twenty-fourth Day of May, 1994

Attest:

BRUCE LEHMAN

*Attesting Officer*      *Commissioner of Patents and Trademarks*